(12) United States Patent
Tamura et al.

(10) Patent No.: US 7,108,317 B2
(45) Date of Patent: Sep. 19, 2006

(54) TILT SUNROOF UNIT

(75) Inventors: Michio Tamura, Saitama (JP); Yoshitaka Higuchi, Tochigi (JP)

(73) Assignees: Honda Motor Co., Ltd., Tokyo (JP); Yachiyo Kogyo Kabushiki Kaisha, Saitama (JP)

( * ) Notice: Subject to any disclaimer, the term of this patent is extended or adjusted under 35 U.S.C. 154(b) by 0 days.

(21) Appl. No.: 10/704,674

(22) Filed: Nov. 12, 2003

(65) Prior Publication Data
US 2004/0135403 A1 Jul. 15, 2004

(30) Foreign Application Priority Data
Nov. 12, 2002 (JP) .......................... P.2002-328255
Nov. 12, 2002 (JP) .......................... P.2002-328263
Nov. 12, 2002 (JP) .......................... P.2002-328272

(51) Int. Cl.
*B60J 7/10* (2006.01)
(52) U.S. Cl. .................... 296/218; 292/DIG. 5
(58) Field of Classification Search ................ 296/218, 296/224; 292/DIG. 5
See application file for complete search history.

(56) References Cited

U.S. PATENT DOCUMENTS

| 3,974,753 | A | * | 8/1976 | Blomgren et al. | ........... 296/218 |
| 4,005,901 | A | | 2/1977 | Lutke et al. | |
| 4,342,481 | A | * | 8/1982 | Kanou et al. | ............. 296/217 |
| 4,466,644 | A | * | 8/1984 | Wooten et al. | ............. 292/263 |
| 4,618,176 | A | * | 10/1986 | Farmont | ............... 292/263 |
| 4,626,026 | A | * | 12/1986 | Hasegawa | ................ 296/218 |
| 4,747,630 | A | | 5/1988 | Isomine et al. | |
| 4,781,410 | A | * | 11/1988 | Gantner et al. | ............. 296/217 |
| 4,844,532 | A | * | 7/1989 | Ono et al. | ................. 296/213 |

FOREIGN PATENT DOCUMENTS

| GB | 2136047 | * | 9/1984 | .................. 296/218 |
| JP | 51-139017 | | 12/1976 | |
| JP | 57-46019 | | 8/1980 | |
| JP | 59-157922 | | 10/1984 | |
| JP | 200026 | * | 9/1986 | .................. 296/224 |
| JP | 63-45319 | | 3/1988 | |
| JP | 63-145714 | | 9/1988 | |
| JP | 63-195917 | | 12/1988 | |
| JP | 64-6119 | | 1/1989 | |
| JP | 6-53242 | | 7/1994 | |
| JP | 7-46572 | | 10/1995 | |

OTHER PUBLICATIONS

Automotive Engineering International, "Roof modules:present and future", Apr. 2000, p. 80.*
Japanese Office Action for JP 2002-328255 dated Dec. 20, 2005.
Japanese Office Action for JP 2002-328263 dated Dec. 27, 2005.
Japanese Office Action for JP 2002-328272 dated Jan. 17, 2006.
Japanese Office Action for JP 2002-328277 dated Jan. 31, 2006.
Japanese Office Action for JP 2002-328280 dated Jan. 31, 2006.

* cited by examiner

*Primary Examiner*—Dennis H. Pedder
(74) *Attorney, Agent, or Firm*—Sughrue Mion, PLLC

(57) ABSTRACT

A tilt sunroof unit has a sunroof panel provided tiltably with respect to a plane of an opening provided in a vehicular roof, an annular frame formed so as to extend continuously along an entire periphery of the opening, the annular frame being formed of a single parts in which a peripheral gutter continuing along an entire periphery thereof is integrally formed, and a lifting mechanism for connecting the sunroof panel and the annular frame, wherein the tilt sunroof unit in a subassembled state with the sunroof panel assembled thereto is assembled to the roof

16 Claims, 12 Drawing Sheets

TILT SUNROOF UNIT

BACKGROUND OF THE INVENTION

1. Field of the Invention

The present invention relates to a tilt-type sunroof installed mainly in an automobile.

The present invention also relates to a mechanism for supporting a detachable type sunroof panel, and more particularly to a mechanism for supporting a sunroof panel detachably and so as to be capable of being tilted up in an opening formed in a roof of a vehicle.

The present invention also relates to a detachable type sunroof apparatus, and more particularly to a detachable type sunroof apparatus having a deflector blade for suppressing the entrainment of the wind into a vehicle compartment when a panel is removed.

2. Description of the Related Art

In a conventional sunroof for an automobile, there is a type in which an opening provided in a roof of a vehicle is made capable of being selectively opened or closed by a sunroof panel. As for its opening and closing operation, there are a slide type in which the sunroof panel is slid with respect to the roof and a tilt type in which the sunroof panel is tilted in a vertical direction. As compared to the slide type, the tilt type does not require a large installation space and its structure is simple, so that the tilt type has been used as a simple sunroof (e.g., refer to JP-UM-B-7-46572).

A sunroof apparatus has already been put to practical use in which a sunroof panel made of glass, for instance, is fitted in an opening provided in a roof of an automobile. In this sunroof apparatus, detachable hinge mechanisms are provided between a front edge of the sunroof panel and a corresponding portion of the opening, and a detachable toggle latch mechanism is provided between a rear edge of the sunroof panel and a corresponding portion of the opening, thereby arranging the sunroof panel to be detachable and capable of being tilted up.

Such a mechanism for supporting a detachable type sunroof panel is disclosed in, for instance, JP-UM-A-63-195917 which is constructed such that a male member fixed to the sunroof panel side and having a downwardly convex curved surface is engaged in an insertion hole formed in a female member fixed to the roof side.

A sunroof apparatus is disclosed in, for instance, JP-UM-A-63-195917 which is constructed such that a sunroof panel made of glass, for instance, is fitted in an opening provided in a roof of an automobile. In this sunroof apparatus, detachable hinge mechanisms are provided between a front edge of the sunroof panel and a corresponding portion of the opening, and a detachable toggle latch mechanism is provided between a rear edge of the sunroof panel and a corresponding portion of the opening, thereby arranging the sunroof panel to be detachable and capable of being tilted up.

On the other hand, in the sunroof apparatus, it is known that a deflector blade is fitted along a front edge of the opening so as to suppress the traveling wind from being entrained into the vehicle compartment when the vehicle travels with the opening in the roof open.

In the above-described tilt-type sunroof, since it is unnecessary to provide a complex mechanism such as a sliding up/down mechanism used in the slide-type sunroof, hinge mechanisms for the sunroof panel and a lifting mechanism using links are directly attached to peripheral edges of the opening. For example, bracket portions are provided by working and forming portions of a roof member (such as a roof panel) corresponding to edge portions of the opening in the roof, and fixing portions of the respective mechanisms are fixed to the bracket portions.

However, in a sunroof assembly line, the fixing portions of the respective mechanisms are, for instance, welded to the roof member-side bracket portions, and the sunroof panel is subsequently assembled to them, so that the operation in the line has been troublesome. Further, since positioning with respect to the opening is affected by the positional accuracy in the attachment of the hinge mechanisms and the lifting mechanism, there has been a problem in that its adjustment operation also becomes troublesome.

According to the conventional supporting mechanism, the female member is an integrally molded piece made of a synthetic resin, and it has been difficult to mold the insertion hole for receiving the curved male member with high accuracy. In particular, if the fitting of the male member into the insertion hole becomes tight due to such as the occurrence of deformation of the curved surface of the male member formed by press working a steel plate, the attachment and detachment of the sunroof panel become difficult. In a worst case, it can become impossible to detach the sunroof panel.

In contrast, if the fitting of the female member and the male member is set to be loose, faulty installation occurs between the sunroof panel and the roof, possibly resulting in the occurrence of buffeting and air leak noise during traveling.

However, essentially, the primary consideration of the detachable sunroof apparatus such as the one disclosed in the aforementioned publication is that it can be manufactured at low cost. Accordingly, its structure is generally made extremely simple. For this reason, if the ratio of the cost of the deflector blade to the overall apparatus is taken into consideration, it has been, in a way, difficult to say that it is realistic to apply to the detachable type sunroof apparatus the construction of such a deflector blade of the conventional type that is installed on the sunroof apparatus accommodated underneath the roof by being power driven.

SUMMARY OF THE INVENTION

The present invention has been devised to overcome the above-described problems of the conventional art, and its object is to provide a panel supporting mechanism for a detachable type sunroof apparatus which is so constructed that as to easily enhance the accuracy and to be removed relatively easily even if deformation or the like has occurred in the male member.

The present invention has been devised to overcome the above-described problem of the conventional art, and its object is to provide a detachable type sunroof apparatus having a deflector blade which is low in the manufacturing cost.

To facilitate the operation of assembling the tilt-type sunroof to the vehicle and realize the improvement of the positional accuracy of the sunroof panel by overcoming the above-described problems, in accordance with a first aspect of the present invention there is provided a tilt sunroof unit having a sunroof panel provided tiltably with respect to a plane of an opening provided in a vehicular roof, an annular frame formed so as to extend continuously along an entire periphery of the opening, the annular frame being formed of a single parts in which a peripheral gutter continuing along an entire periphery thereof is integrally formed, and a lifting mechanism for connecting the sunroof panel and the annular frame, wherein the tilt sunroof unit in a subassembled state with the sunroof panel assembled thereto is assembled to the roof.

According to a second aspect of the present invention, there is provided the tilt sunroof unit according to the first aspect, wherein the lifting mechanism is of a manual type.

According to a third aspect of the present invention, there is provided the tilt sunroof unit according to the first aspect, wherein the sunroof panel is detachable with respect to the plane of the opening provided in the vehicle roof.

According to the above-described construction, since the sunroof panel is subassembled to the annular frame, these parts can be carried in the state of the subassembly. For this reason, the parts can be carried in after ensuring the quality of the sunroof in an assembled state, and the assembly to the vehicle on the line is facilitated. Further, the characteristic of tilting operation and positional accuracy can be designed and confirmed with respect to the subassemblage before its assembly to the vehicle. In contrast, in the conventional type in which a supporting frame for supporting the sunroof panel is formed in the body panel of the vehicle, the assembling operation becomes complex, involving such as the subassembling of the hinge mechanisms and the lifting mechanism with respect to the sunroof panel on the line side. Also, adjustment operation becomes troublesome due to the need to effect confirmation of the tilting operation after assembling on the line. In the structure of the present invention, however, such problems do not occur.

According to a fourth aspect of the present invention, there is provided the tilt sunroof unit according to the first aspect, further having a female member provided on the annular frame at an opening side of the roof and having an upper member and a lower member which are formed so as to be split from each other, and a male member provided at one edge portion of the sunroof panel to engage the female member, wherein a gap is formed between the upper member and the lower member and, a detachable hinge mechanism is formed by the female member and the male member as the male member is inserted in the gap.

According to a fifth aspect of the present invention, there is provided the tilt sunroof unit according to the fourth aspect, wherein a longitudinal cross-sectional shape of the male member is a circular arc shape which is downwardly convex.

According to a sixth aspect of the present invention, there is provided the tilt sunroof unit according to the fourth aspect, wherein a plurality of protrusions are formed on an inner surface of the female member which comes into sliding contact with the male member.

According to a seventh aspect of the present invention, there is provided the tilt sunroof unit according to the fourth aspect, wherein a slit is formed in the male member, and a pin adapted to enter the slit is formed on the female member.

According to the above-described construction, since the receiving hole for the male member can be formed between the two members, it becomes unnecessary to form the inner surface of the receiving hole by a cutting die, so that it is possible to easily enhance the dimensional accuracy of the gap for receiving the male member. Accordingly, it becomes possible to support the male member so as to be free of play. Also, since the two members can be disassembled, even if the male member is deformed, the panel of the sunroof apparatus can be removed relatively easily.

To attain the above object, in accordance with a eighth aspect of the present invention there is provided the tilt sunroof unit according to the fourth aspect, further having a deflector blade extending along a front edge of the opening, wherein a pair of supporting portions for supporting left and right ends of the deflector blade so as to be raised and lodged are fixed to the annular frame by fixing members being common to the female member.

According to a ninth aspect of the present invention, there is provided the tilt sunroof unit according to the eighth aspect, wherein the fixing members are screws.

In this construction, since it is possible to suppress an increase in the number of component parts and the number of manufacturing steps, it is possible to construct the detachable type sunroof apparatus with a deflector blade by minimizing an increase in the manufacturing cost.

According to a tenth aspect of the present invention, there is provided the tilt sunroof unit according to the first aspect, wherein the lifting mechanism includes a lever having one end pivotally supported by the sunroof panel and holding the sunroof panel selectively between two positions of a fully closed state and a tilt-up state, and a link rod connected between the annular frame and an intermediate portion of the lever, wherein in the fully closed state the lever becomes a substantially lodged state with respect to the roof, and in the tilt-up state the lever becomes a substantially raised state with respect to the roof, where in an engaging projecting portion is provided on one of the lever and a roof-side member, while an engaging recessed portion is provided on the other thereof, the engaging projecting portion is entered the engaging recessed portion by an operation of the lever leading to the raised state, and wherein in the substantially raised state of the lever the engaging recessed portion and the engaging projecting portion are engaged so as to prevent the displacement of the sunroof panel in a tilting direction.

According to a eleventh aspect of the present invention, there is provided the tilt sunroof unit according to the tenth aspect, wherein at least one of the engaging projecting portion and the engaging recessed portion is formed of a damping material.

Thus, since the engaging projecting portion and the engaging recessed portion in the substantially upright state of the lever are engaged with each other in the vertical direction. In the tilting direction of the sunroof panel, it is possible to suppress the rattling of the sunroof panel in the tilting direction. Accordingly, even if the sunroof panel tends to resonate due to vibrations during traveling or the like, in the aforementioned engaging state the engaging recesses bite into the upper and lower surfaces of the stopper made of a damping material, so that the vibration of the sunroof panel at its engaged portions can be suitably prevented.

DETAILED DESCRIPTION OF THE PREFERRED EMBODIMENTS

Hereafter, a detailed description will be given of an embodiment of the present invention on the basis of a specific example shown in the appended drawings.

Figure 1:
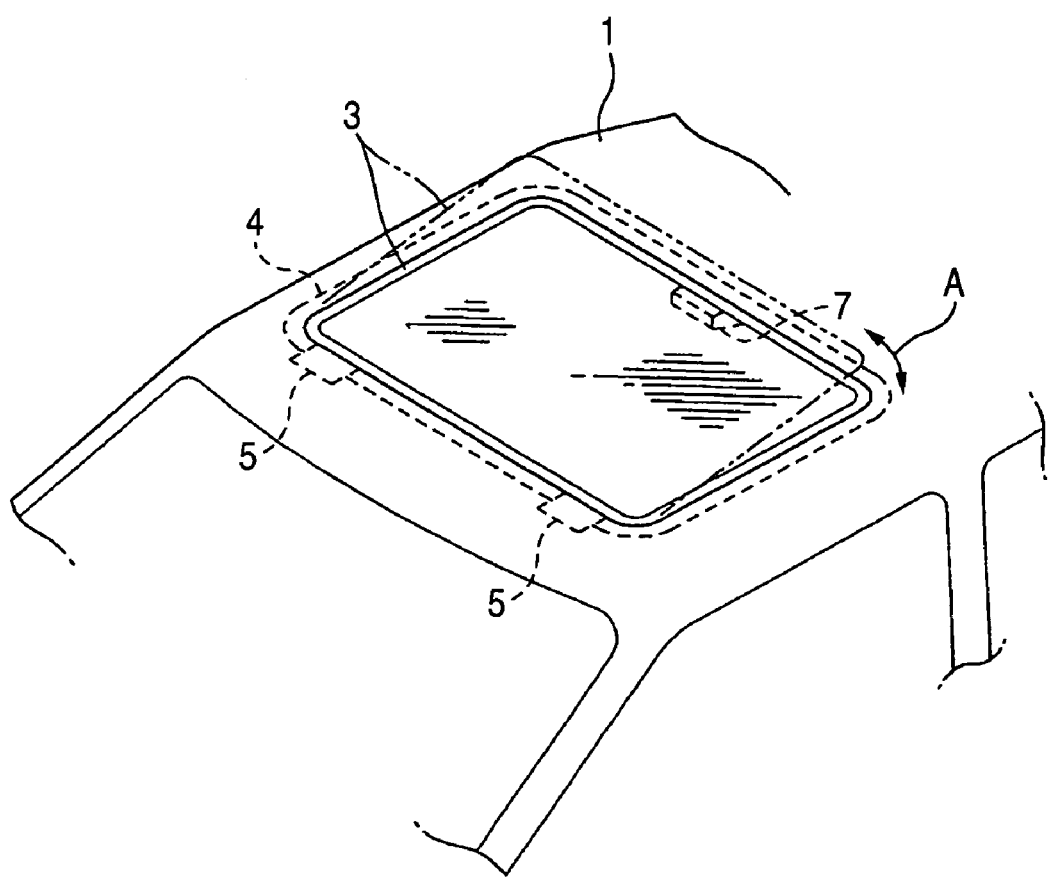
FIG. 1 is a perspective view of essential portions illustrating a tilt-type sunroof for an automobile to which the present invention is applied.

FIG. 1 is a perspective view of essential portions illustrating a tilt-type sunroof for an automobile to which the present invention is applied. As shown in the drawing, a rectangular opening 2 is provided in an appropriate portion of a vehicular roof 1, and that opening 2 is adapted to be opened or closed by a sunroof panel 3 which is tiltable, as shown by arrow A in the drawing. The sunroof panel 3 in this illustrated example is formed by a rectangular glass panel and a metallic supporting frame 3a for supporting its peripheral edge portions.

Figure 2:
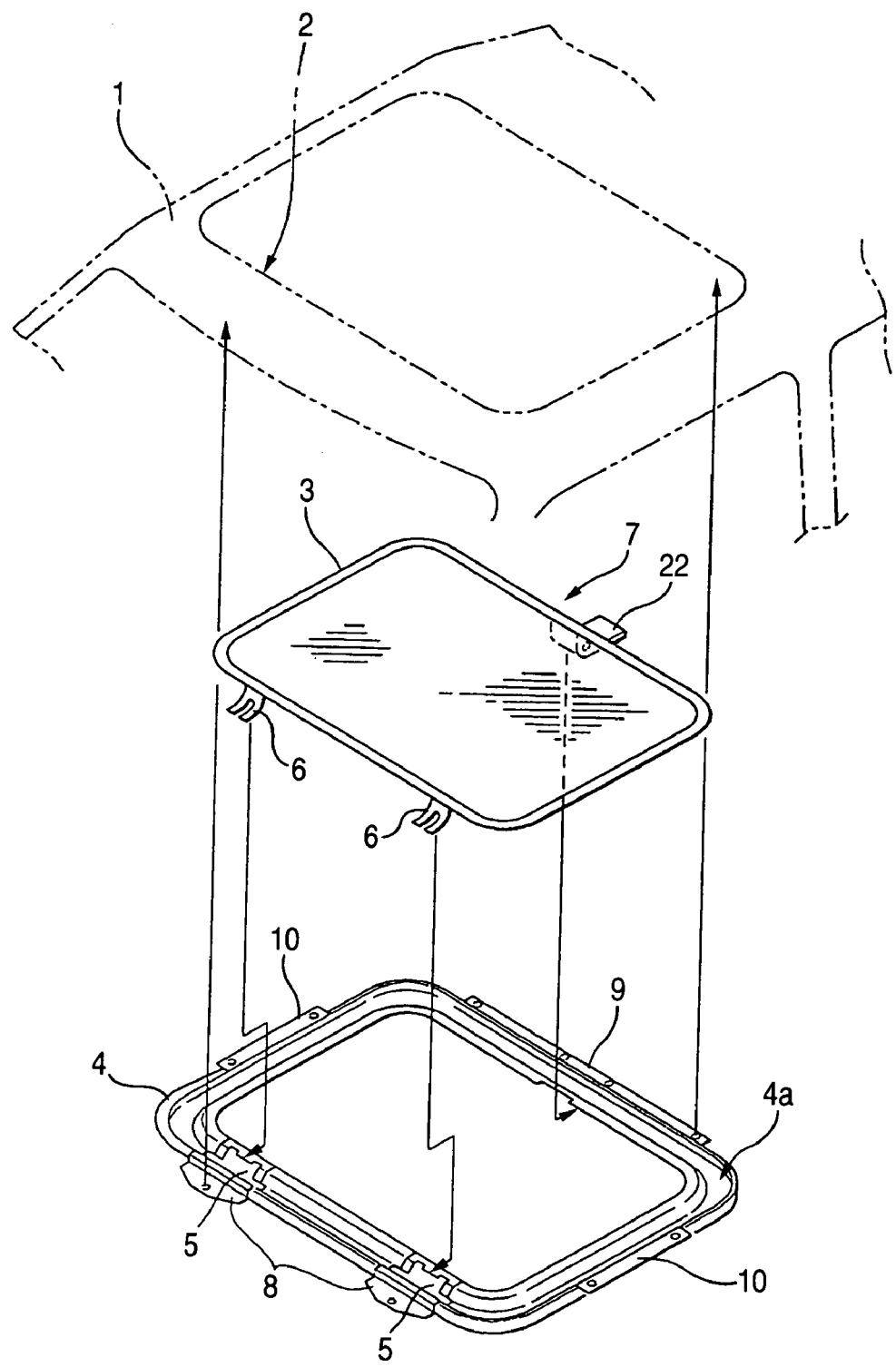
FIG. 2 is an exploded assembly perspective view of the tilt-type sunroof in accordance with the present invention.

FIG. 2 is an exploded assembly perspective view of the sunroof in accordance with the present invention. As shown in the drawing, a rectangular annular frame 4, which is attached from the inner side of the vehicle compartment to the roof panel, i.e., a member for forming the vehicular roof 1, is used as this sunroof. Receivers 5 for tiltably supporting the sunroof panel 3 are respectively provided at appropriate portions (two portions at the left and the right in the illustrated example) of a vehicle front-side edge portion of that annular frame 4. A pair of left and right engaging tongues 6 are provided at a vehicle front-side edge portion of the supporting frame 3a of the sunroof panel 3 at symmetrical positions with respect to the center line of the vehicle. Hinge mechanisms are formed by these engaging tongues 6 and receivers 5.

A lifting mechanism 7 is provided between central portions of respective vehicle rear-side edge portions of the sunroof panel 3 and the annular frame 4. It should be noted that although the arrangement shown in FIG. 2 is such that the lifting mechanism 7 is connected to the sunroof panel 3 side, a part of the lifting mechanism 7 is connected to the annular frame 4 side in an assembled state. Consequently, the engaging tongues 6 are respectively engaged with the receivers 5, and the annular frame 4 and the sunroof panel 3 are connected to each other by means of the lifting mechanism 7, thereby allowing the annular frame 4 and the sunroof panel 3 to be integrally formed into a subassembly. The annular frame 4 and the sunroof panel 3 in the subassembled state are mounted in the roof 1.

Figure 3:
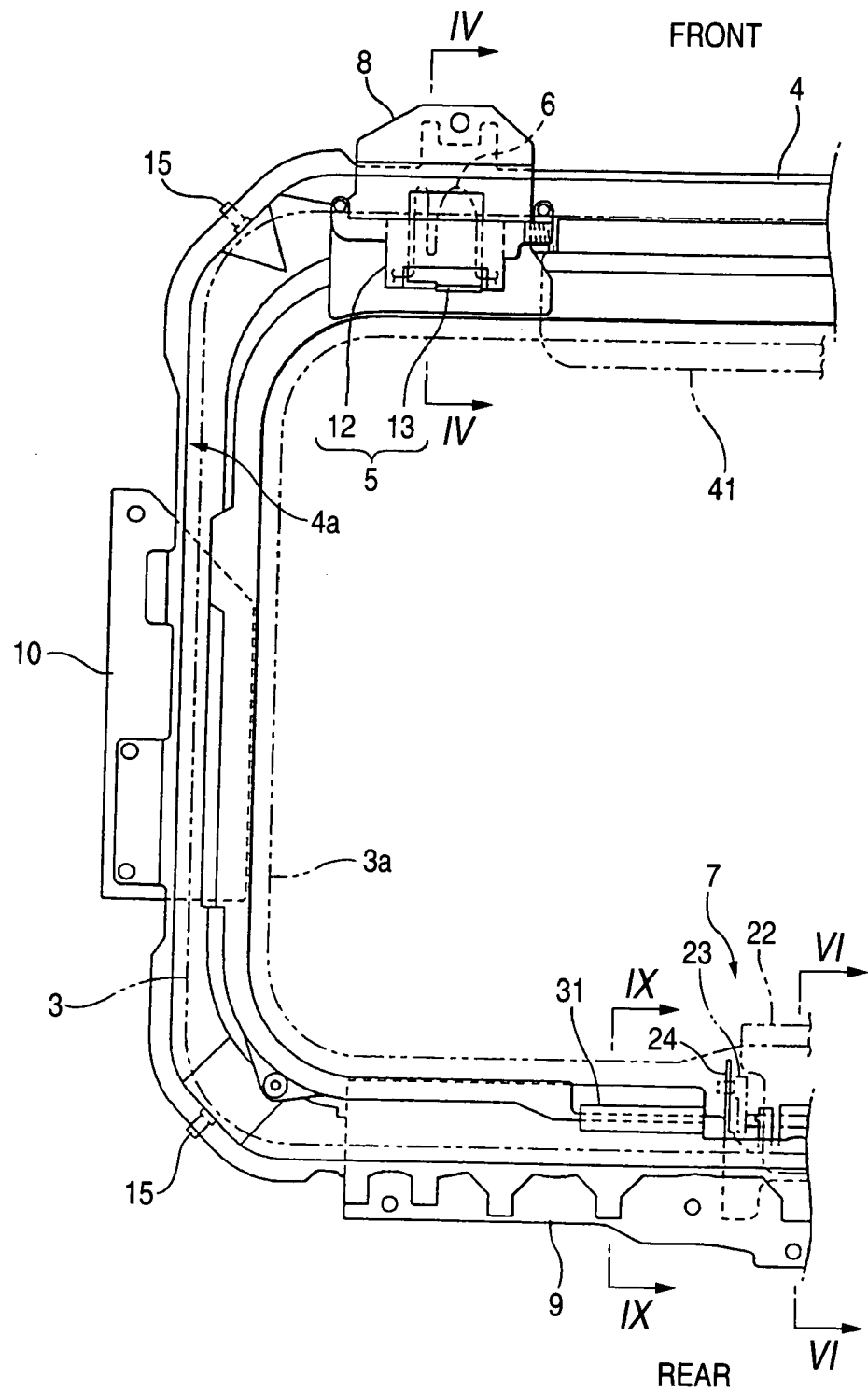
FIG. 3 is a plan view of essential portions of an annular frame.

FIG. 3 shows a plan view of a left half of the annular frame 4. The annular frame 4 is formed by, for example, press working a sheet material so as to be bilaterally symmetrical with respect to the vehicle longitudinal center line. By this press working, a peripheral gutter 4a having a U-shaped cross section is continuously formed around the entire periphery of the annular frame 4. This gutter 4a is formed so as to be located below the periphery of the opening 2 so as to receive droplets which enter from the gap between the opening 2 and the sunroof panel 3. Further, drain pipes 15 are provided at four corners of the gutter 4a. Un illustrated hoses are attached to the drain pipes 15 to discharge water accumulated in the gutter 4a from a lower portion of the vehicle to the outside.

A pair of front-side mounting brackets 8 are provided on the front-side edge portion of the annular frame 4 at positions overlapping the receivers 5, while a rear-side mounting bracket 9 is provided on the rear-side edge portion thereof over a substantially entire range of its straight portion. Meanwhile, a pair of lug-like brackets 10 are respectively provided on a left-side edge portion and a right-side edge portion of the annular frame 4. The brackets 8, 9, and 10 are formed by press working a sheet material, and are, for instance, spot-welded to the obverse surface or reverse surface of the annular frame 4 so as to project outwardly of the annular frame 4. Further, screw insertion holes for screwing down to the panel of the roof 1 side are provided at appropriate portions of the brackets 8, 9, and 10. The rigidity of the annular frame 4 is secured by forming the aforementioned peripheral gutter 4a. The rigidity is further enhanced by such as varying the cross-sectional shape of the gutter 4a at appropriate places with out making the cross-sectional shape uniform over its entire periphery. In addition, the rigidity is also enhanced at portions where the brackets 8, 9, and 10 are secured. Accordingly, it is possible to suppress the occurrence of warpage in the state of a subassembly with the sunroof panel 3 assembled, and carrying into a line and assembly to the vehicle can be effected in that subassembled state, so that the operating efficiency is excellent.

Next, referring to FIG. 4, a description will be given of the structure of the receiver 5 and the engaging tongue 6 which make up the hinge mechanism. As shown in the drawing, the receiver 5 consists of a lower member 11 which is fixedly provided on the annular frame 4, as well as an upper member 12 which is assembled so as to be superposed on the lower member 11. The engaging tongue 6 is formed in a shape in which a flat plate is curved into an arcuate shape. The lower member 11 is provided with a recess-shaped lower guide portion 13 having a curved bottom surface to render the engaging tongue 6 rotatable about the center of the arcuate shape. Meanwhile, the upper member 12 is provided with a recess-shaped upper guide portion 14 having a curved ceiling surface and opposing the bottom surface of the lower guide portion 13 with a predetermined gap. The engaging tongue 6 is adapted to be inserted in the gap between the two guide portions 13 and 14. The vehicle front side of the sunroof panel 3 is thus supported.

Figure 4:
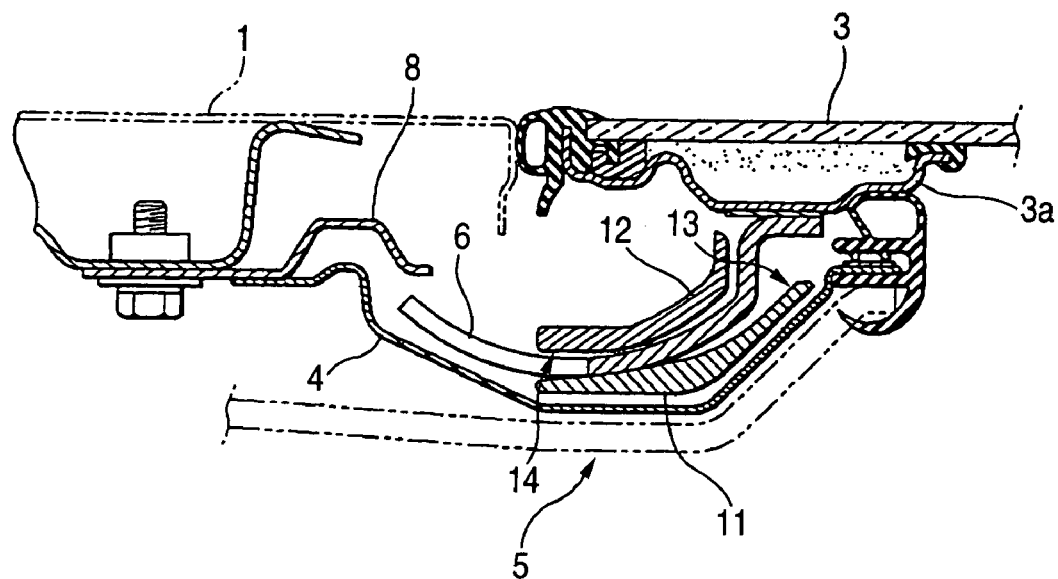
FIG. 4 is a cross-sectional view, taken in the direction of arrows along line IV—IV in FIG. 3, of essential portions illustrating a hinge mechanism in a fully closed state.
Figure 5:
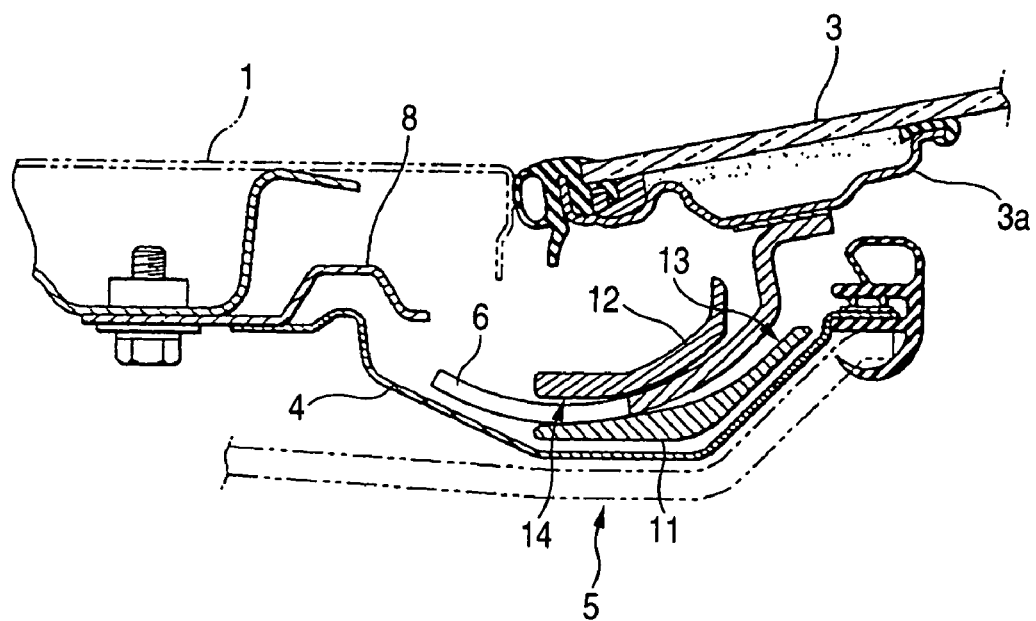
FIG. 5 is a diagram illustrating the hinge mechanism in an open state and corresponding to FIG. 4.

FIG. 4 shows the state of the hinge mechanism when the sunroof panel 3 is fully closed, and when the sunroof panel 3 is tilted up, the state becomes as shown in FIG. 5. As can be seen from comparison between FIGS. 4 and 5, the engaging tongue 6 is guided by a curved slot formed between the upper and lower members 12 and 11 of the receiver 5 in correspondence with the tiling operation of the sunroof panel 3. The hinge mechanism for tiltably supporting the vehicle front-side portion of the sunroof panel 3 is thus constructed.

Next, a description will be given of the lifting mechanism 7 with reference to FIGS. 6 and 7. The lifting mechanism 7 is comprised of a base member 21 fixedly provided on a lower surface of the frame 3a of the sunroof panel 3 by, for example, screwing down; a lever 22 whose one end portion is pivotally supported by the base member 21; and a pair of link rods 23 for connecting a bracket 24 fixedly provided on the rear-side mounting bracket 9 and an intermediate portion of the lever 22. It should be noted that the base member 21 is a metallic pressed product, and the lever 22 and the link rods 23 are formed by molding a synthetic resin material.

A pivotal shaft 25 is integrally provided at one end portion of the lever 22 with its intermediate portion molded, and both end portions of the pivotal shaft 25 are supported in a pair of pivotally supporting holes provided in the base member 21. As a result, the lever 22 is provided swingably with respect to the base member 21. The intermediate portion of the lever 22 is formed with a U-shaped cross section, and one end portions of the pair of link rods 23, which are respectively disposed on outer sides of the left and right side wall portions of the intermediate portion, are coaxially pivotally supported by a shaft member 26 passed through both side wall portions. A pair of shaft portions 23a provided so as to project in mutually opposite directions are respectively provided on the other end portions of the link rods 23. The shaft portions 23a are rotatably connected to the bracket 24.

Figure 6:
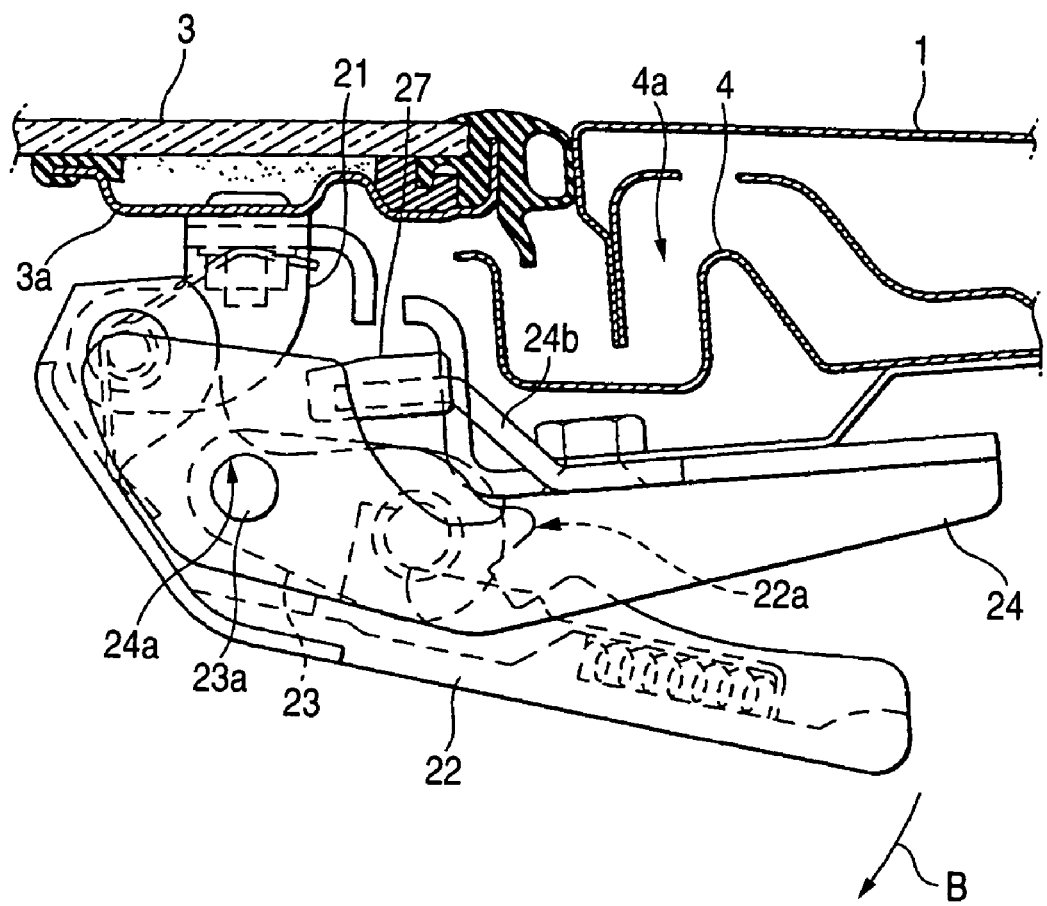
FIG. 6 is a cross-sectional view, taken in the direction of arrows along line VI—VI in FIG. 3, of essential portions illustrating a lifting mechanism in a fully closed state.
Figure 7:
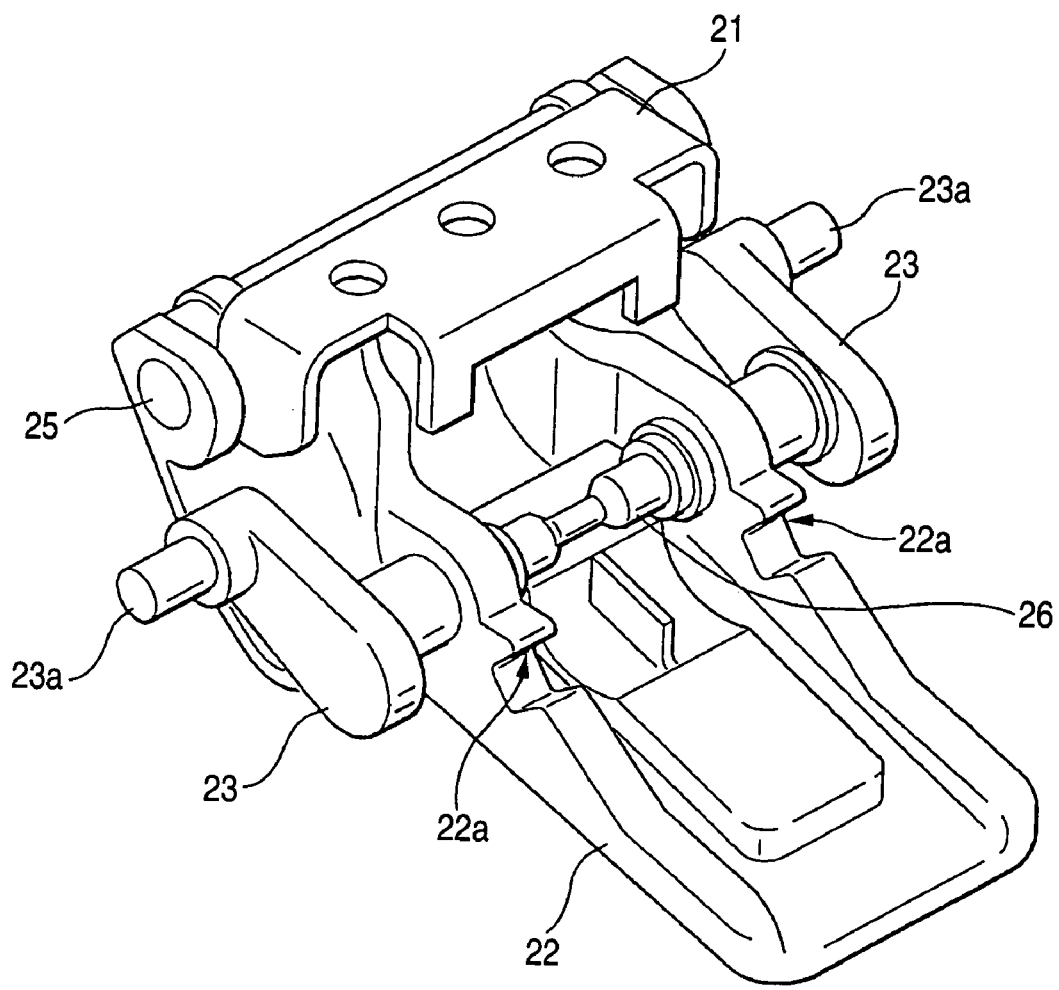
FIG. 7 is a perspective view of essential portions illustrating the lifting mechanism.

With the lifting mechanism 7 thus constructed, in FIG. 6 illustrating the closed state of the sunroof panel 3, the lever 22 is held in a position in which it assume a lodged state with respect to the roof 1. In this state, even if an attempt is made to lift the sunroof panel 3 by an external force, the lever 22 is prevented from rotating in a tilt-up operating direction indicated by arrow B in the drawing owing to its positional relationship with connecting points of the link rods 23. In contrast, the lever 22 can be rotated with the shaft portions 23a of the link rods 23 serving as a fulcrum by operating the lever 22 so as to be rotated in the direction shown by arrow B. By the operation of the lever 22 in the direction of arrow B, as shown in FIG. 8, the link rods 23 rotate by about a ¾ revolution about their shaft portions 23a and are set in a substantially upright state, and the lever 22 also becomes a substantially upright state with respect to the roof 1, thereby tilting up the sunroof panel 3.

The lever 22 is raised so as to pass around the annular frame 4 from its lower side toward the upper side. In the illustrated example, the annular frame 4 side of the lever 22 is formed with the U-shaped cross section, and a pair of engaging recesses 22a, which are open toward the annular frame 4, are respectively formed in its left and right side wall portions. In addition, in the illustrated example, a cutout portion 24a is formed so as to extend from an intermediate portion of the bracket 24 toward the lever 22 side in the substantially upright state, and an elastomer-made stopper 27 serving as an engaging projection is secured to an extended end portion of that cutout portion 24a. The cross-sectional shapes of the engaging recesses 22a and the stopper 27 are set to substantially identical sizes having mutually complementary shapes.

Figure 8:
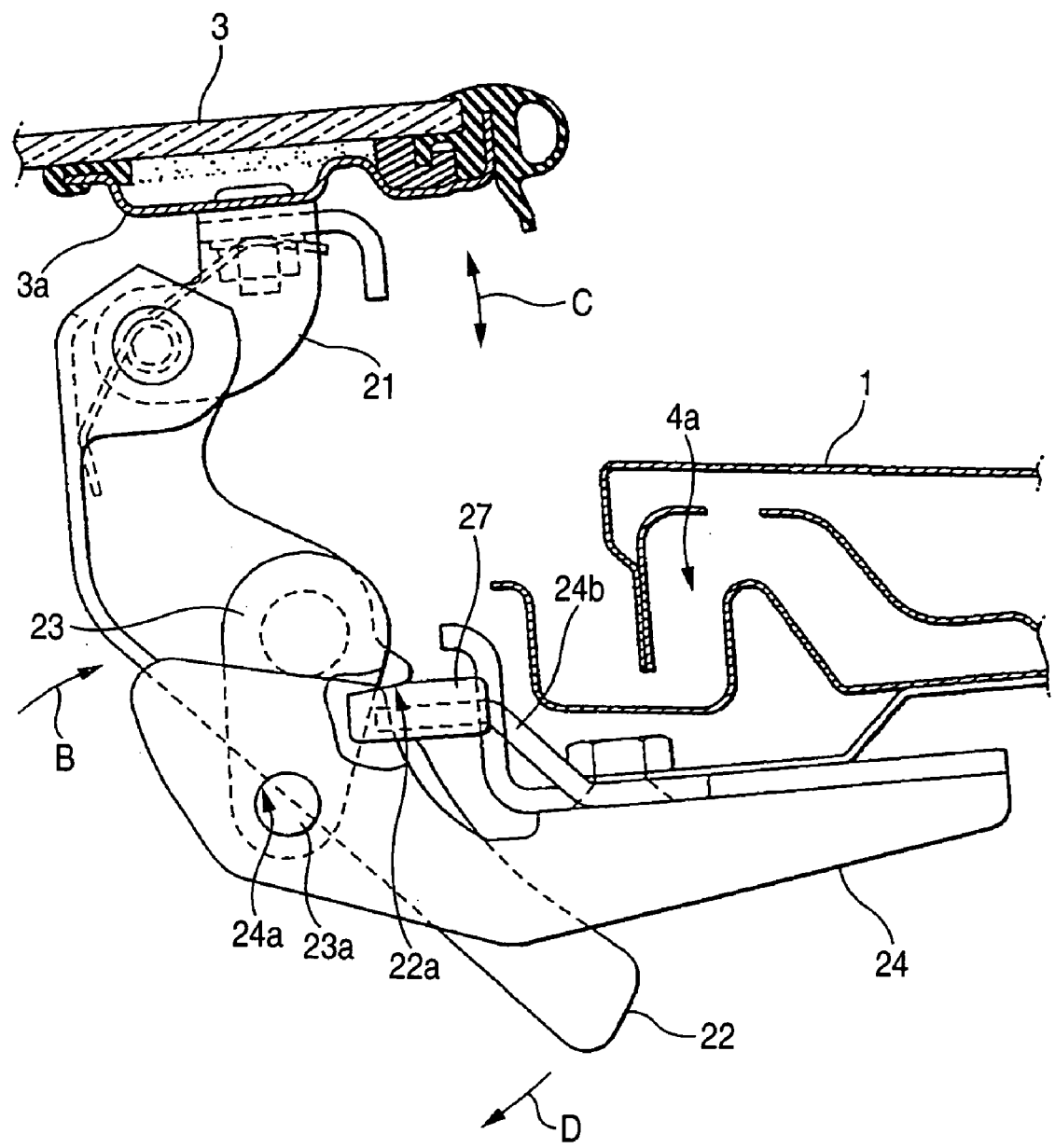
FIG. 8 is a diagram illustrating the lifting mechanism in the fully open state and corresponding to FIG. 6.

When the sunroof panel 3 is tilted up and becomes a fully open position, since the lever 22 is capable of being rotated as shown by arrow B in FIG. 8, the stopper 27 relatively enters the engaging recesses 22a. It should be noted that the projecting end portion of the stopper 27 is formed in a gently tapered shape, so that the stopper 27 is capable of easily plunging into the engaging recesses 22a.

Even if an attempt is made to press down the sunroof panel 3 in the tilted-up state by an external force, the direction of the force applied to the point of connection between the sunroof panel 3 and the lever 22 coincides with the direction in which the stopper 27 is made to further engage the engaging recesses 22a, so that the lowering of the sunroof panel 3 is prevented. Also, with respect to the direction in which the sunroof panel 3 is lifted up, the engaging recesses 22a and the lower surface of the stopper 27 are engaged, and the annular frame 4 and the sunroof panel 3 assume a state of being directly joined by the lever 22 without the medium of the link rods 23. Therefore, the rising of the sunroof panel 3 is prevented.

Thus, since the stopper 27 and the engaging recesses 22a in the substantially upright state of the lever 22 are engaged with each other in the vertical direction shown by arrow C in the drawing, i.e., in the tilting direction of the sunroof panel 3, it is possible to suppress the rattling of the sunroof panel 3 in the tilting direction. Accordingly, even if the sunroof panel 3 tends to resonate due to vibrations during traveling or the like, in the aforementioned engaging state the engaging recesses 22a bite into the upper and lower surfaces of the stopper 27 made of a damping material, so that the vibration of the sunroof panel 3 at its engaged portions can be suitably prevented.

Accordingly, even if free play is present at the connecting portions of the link rods 23 due to tolerances, the free play does not appear as free play in the tilted-up state of the sunroof panel 3, and it is possible to suppress abnormal noise caused by the free play in the connecting portions. Since the engaging recesses 22a and the stopper 27 are thus engaged in the tilting direction, the tilted-up state of the sunroof panel 3 is stabilized.

Figure 9:
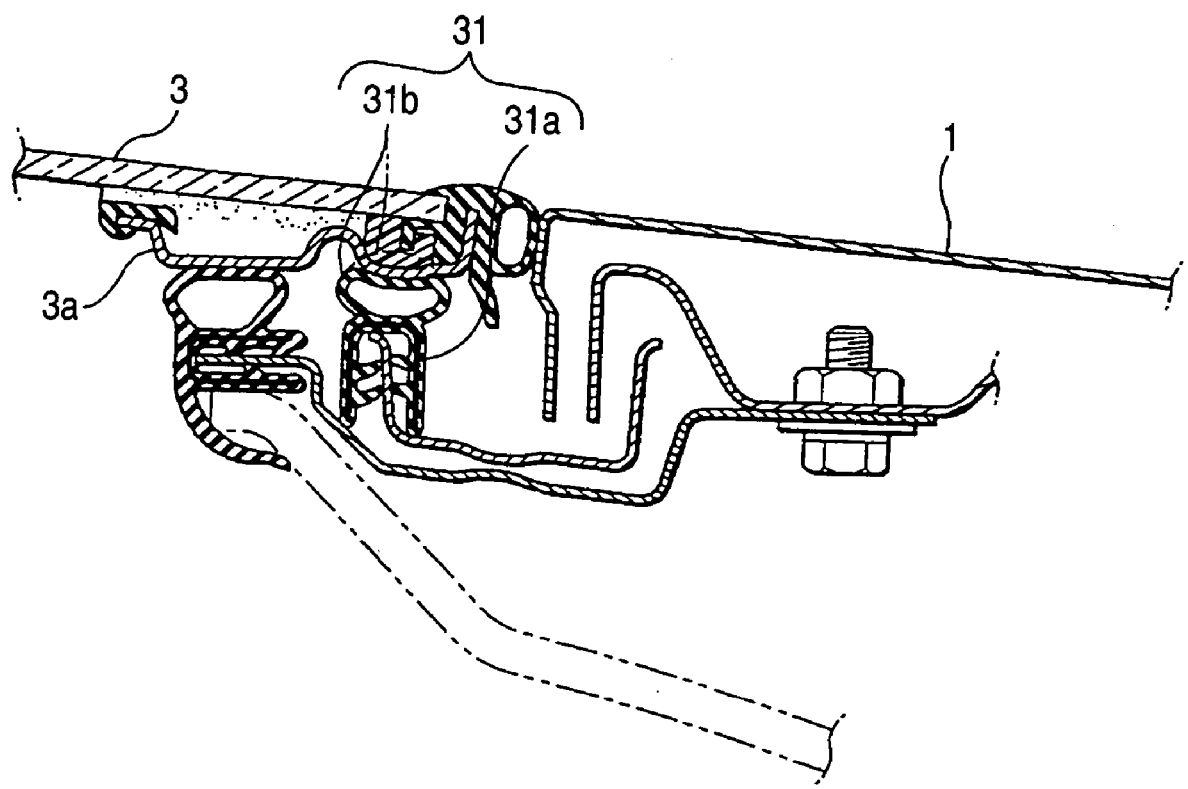
FIG. 9 is a cross-sectional view, taken in the direction of arrows along line IX—IX in FIG. 3, of essential portions.
Figure 10:
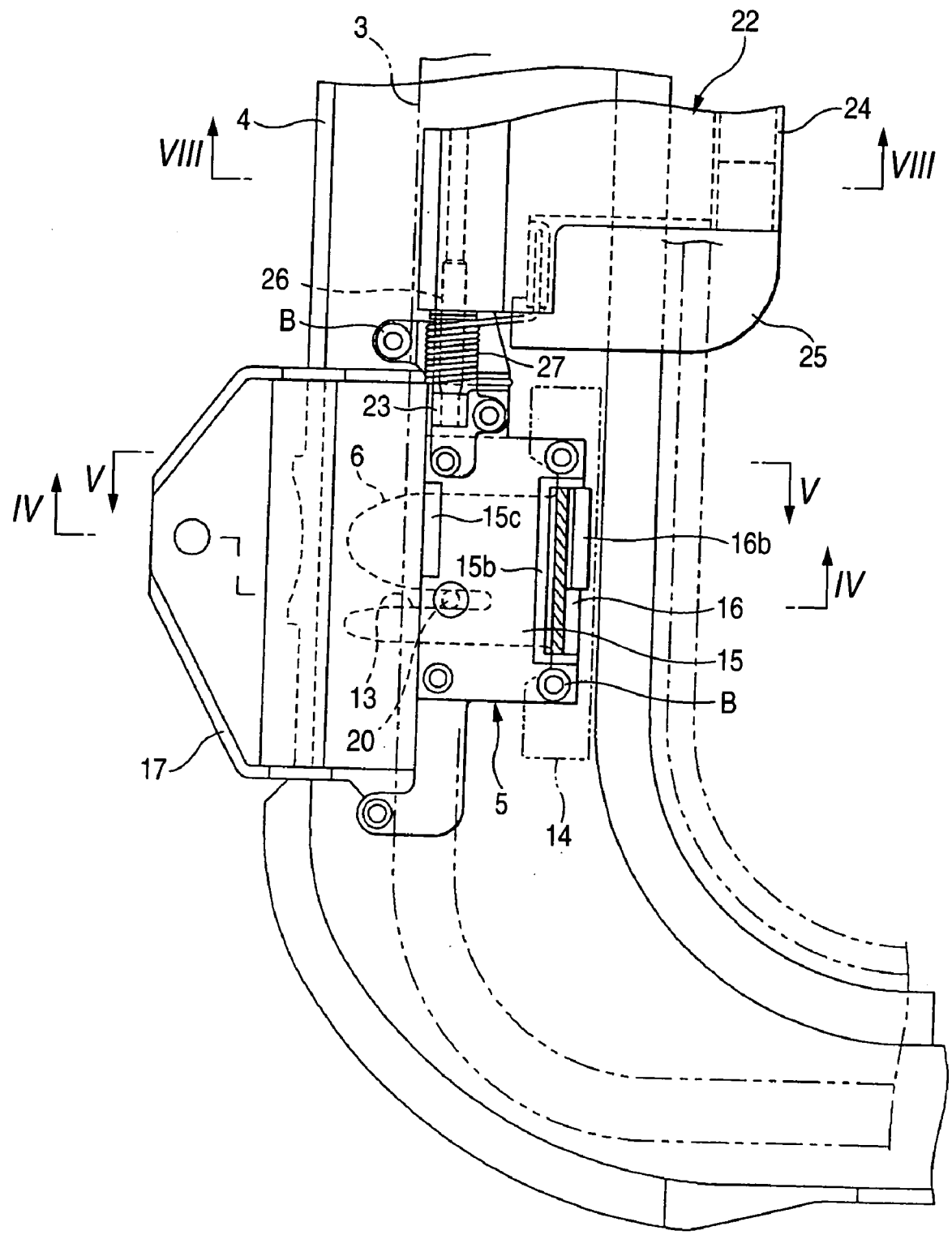
FIG. 10 is a top view of essential portions of the sunroof apparatus, illustrating an attaching portion of a hinge mechanism in accordance with the present invention.

In addition, a pair of left and right resiliently pressing members 31 formed of an elastomeric material are provided at vehicle rear-side edge portions of the annular frame 4 in a state in which the lifting mechanism 7 provided in the center is sandwiched therebetween. As shown in FIG. 9, portions of the rear-side bracket 9 formed integrally with the annular frame 4 are formed with U-shaped cross sections, and resiliently engaging leg portions 31a of the resiliently pressing members 31 are provided on their inner peripheral wall portions, while hollow resilient head portions 31b which are integrally molded are formed on the sunroof panel 3 side of the resiliently engaging leg portions 31a.

In the fully closed state of the sunroof panel 3, the positional relationship in the mounting of the respective members is set such that the pair of left and right resilient head portions 31b are pressed by the bottom surface of the supporting frame 3a of the sunroof panel 3 so as to assume the flat compressively deformed state shown by the solid lines from the state shown by the phantom lines in FIG. 9. Since resilient repulsion is produced by the compressive deformation of the resilient head portions 31b, the vehicle rear-end portion side of the sunroof panel 3 is resiliently held by the left and right portions with the lifting mechanism 7 sandwiched therebetween. In a case where the center of the sunroof panel 3 is held by the lifting mechanism 7 alone, slanting to the left or the right is likely to occur with the connecting portion of the lifting mechanism 7 as a fulcrum. However, since the slanting can be suppressed by virtue of the above-described structure, the flush mounting feature of the sunroof panel 3 with respect to the upper surface of the roof 1 can be realized with a simple structure.

In addition, as shown in FIG. 3, a deflector 41 is provided on the vehicle front side of the sunroof for preventing the traveling wind to enter the vehicle compartment through the opening 2 when the sunroof panel 3 has been removed. This deflector 41 is pivotally supported by bearing brackets (not shown) respectively screwed down to the upper sides of the pair of upper members 12 of the above-described receivers 5, so as to be rotatable between two positions, i.e., between a position in which the deflector 41 is lodged toward the rear side of the vehicle and a position in which it is obliquely raised so as to face the front side of the vehicle.

This deflector 41 is constantly resiliently urged in a rising direction by a torsion coil spring attached to its pivot. However, in the state in which the sunroof panel 3 is installed, the deflector 41 is pressed in a lodged state by the vehicle front side portion of the supporting frame 3a. In a case where the sunroof panel 3 is removed, the deflector 41 is adapted to rise toward the upper side of the roof 1 by the resiliently urging force of the aforementioned torsion coil spring.

In the sunroof in accordance with the present invention, not only the hinge mechanisms and the lifting mechanism 7 of the sunroof panel 3 but also associated parts such as the deflector 41 are integrally fitted to the annular frame 4 so that they can be handled as a subassembly with the sunroof panel 3 fitted to the annular frame 4, as described above. Consequently, inspection, such as the confirmation of the operation of the sunroof as a completed product and the confirmation of assembling accuracy, can be carried out before carrying it into the vehicle assembly line, and the sunroof can be carried into the vehicle assembly line in the state of high quality. Accordingly, in the vehicle assembly line, it suffices if the annular frame 4 is fixed to the vehicle by such as screwing down the brackets 8, 9, and 10 to the roof-side panel, an it is unnecessary to mount the hinge mechanisms and the lifting mechanism after welding the brackets to the roof-side member in the conventional manner. Thus the sunroof can be assembled to the vehicle in a simple manner. In addition, in a case where fine adjustment is necessary, if an arrangement is provided in advance such that fine adjustment is effected by using the annular frame 4 as a reference, a stable reference position can be specified in advance, so that the adjustment operation can be performed simply.

FIG. 1 is a perspective view of essential portions of a roof portion of an automobile having a sunroof apparatus to which the present invention is applied. As shown in FIG. 1, a substantially rectangular opening 2 is provided in an appropriate portion of a vehicular roof 1, and that opening 2 is adapted to be opened or closed by sunroof panel 3 which is made of, for instance, sheet glass and is detachable and tiltable.

As shown in detail in FIG. 2, this sunroof apparatus has a rectangular loop-like inner frame 4 which is attached to an inner surface of the roof 1. A pair of receivers 5 for connecting a front edge side of the sunroof panel 3 are provided at left and right side portions of a front edge portion of this inner frame 4. A pair of left and right engaging pieces 6 corresponding to the receivers 5 are provided at a front edge portion of the sunroof panel 3. Detachable and tiltable hinge mechanisms are formed by these receivers 5 and the engaging pieces 6.

A toggle latch mechanism 7 is provided in a rear edge-side central portion of the sunroof panel 3. This toggle latch mechanism 7 is arranged such that a portion thereof is connected to a rear edge-side central portion of the inner frame 4 when the sunroof panel 3 is fitted in the opening 2.

As the receivers 5 and the engaging pieces 6 are joined to each other, and sunroof panel 3 and the inner frame 4 are joined to each other by means of the toggle latch mechanism 7, the sunroof panel 3 and the inner frame 4 are integrally subassembled, so that the entire sunroof apparatus in the subassembled state can be mounted in the roof 1.

As shown in FIGS. 3 to 6, a rectangular loop-like panel holder 11 formed by, for example, stamping a steel plate is fixed to outer peripheral portions of the inner surface of the sunroof panel 3. Further, a seal member 12 which is in close contact with inner peripheral edges of the opening 2 formed in the roof 1 is fitted to outer peripheral edges of the panel holder 11 so as to maintain fluid-tightness between the opening 2 and the sunroof panel 3.

The aforementioned engaging pieces 6 serving as male members are fixed to lower surfaces of left and right side portions of a front edge portion of the panel holder 11. Each of the pair of engaging pieces 6 is formed by stamping a steel plate, has a circular arc shape which, as viewed from a lateral direction, is generally downwardly convex, and, as viewed from above, has a mitten-like shape in which it is bifurcated with a back-and-forth-extending slit 13 formed at a laterally offset position. Further, a lug 14 formed on the rear end side of each engaging piece 6 is fixed to the panel holder 11 by two bolts.

Figure 13:
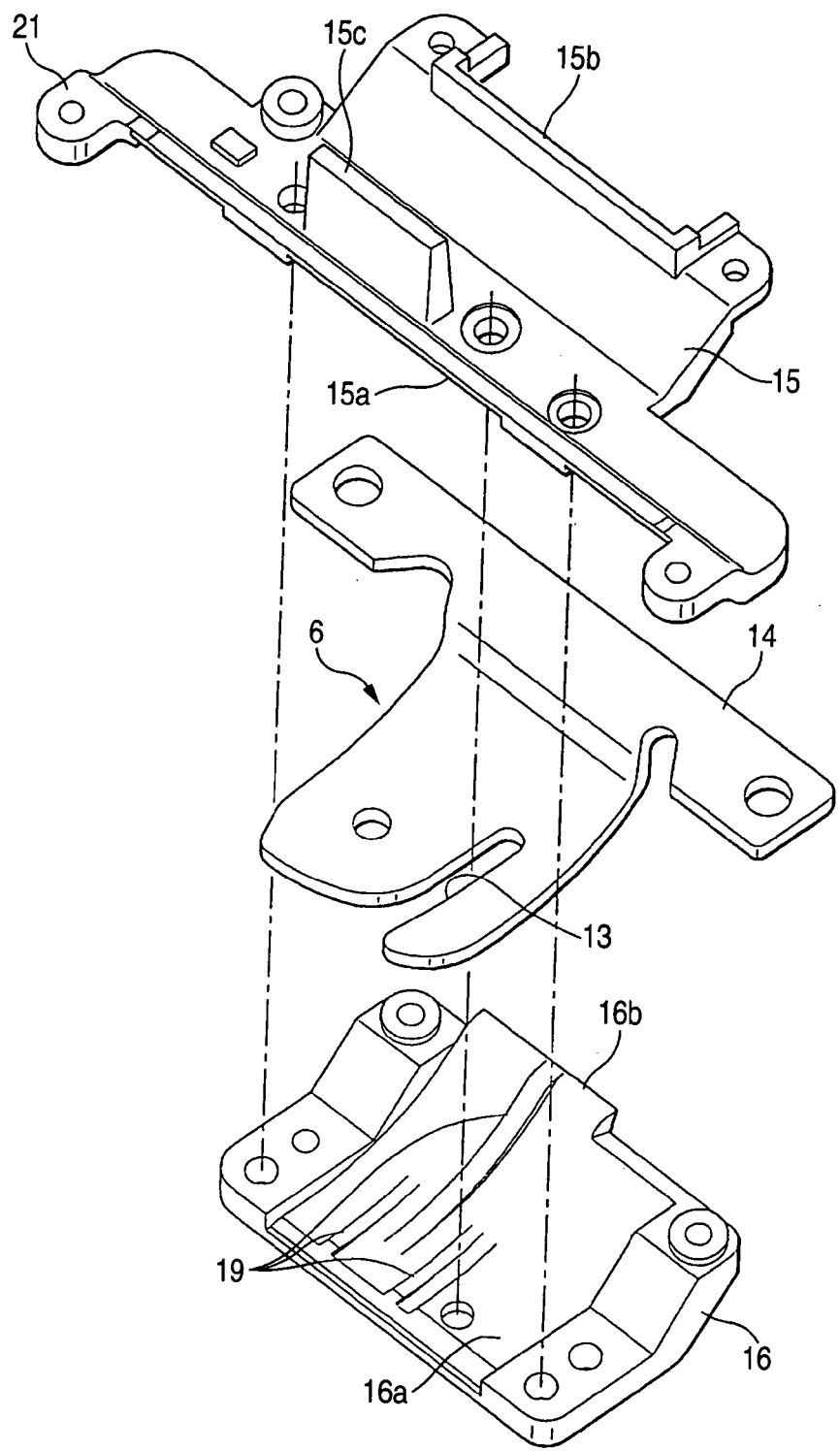
FIG. 13 is an exploded perspective view of the hinge mechanism in accordance with the present invention.

The aforementioned pair of receivers 5 serving as female members are fixed to an upper surface of the front edge side of the inner frame 4, which is fixed to the inner surface of the roof 1, by means of a plurality of screws B. As shown clearly in FIG. 13, each of these receivers 5 consists of two members including an upper member 15 and a lower member 16, and is injection molded by using a hard synthetic resin material. Each of these receivers 5 is fixed to the inner frame 4 as the upper member 15 and the lower member 16 are fastened together by the downwardly inserted screws B in a state in which a bracket 17 integrally joined to the inner frame 4 is clamped by upper and lower surfaces of these two members.

Figure 11:
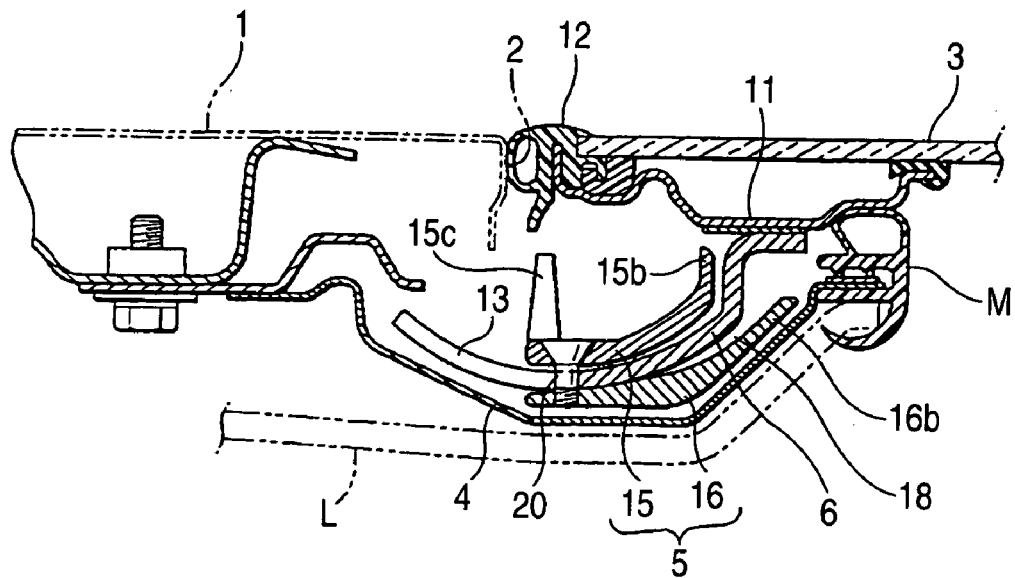
FIG. 11 is a vertical cross-sectional view, taken in the direction of arrows along line IV—IV in FIG. 10, of essential portions.
Figure 12:
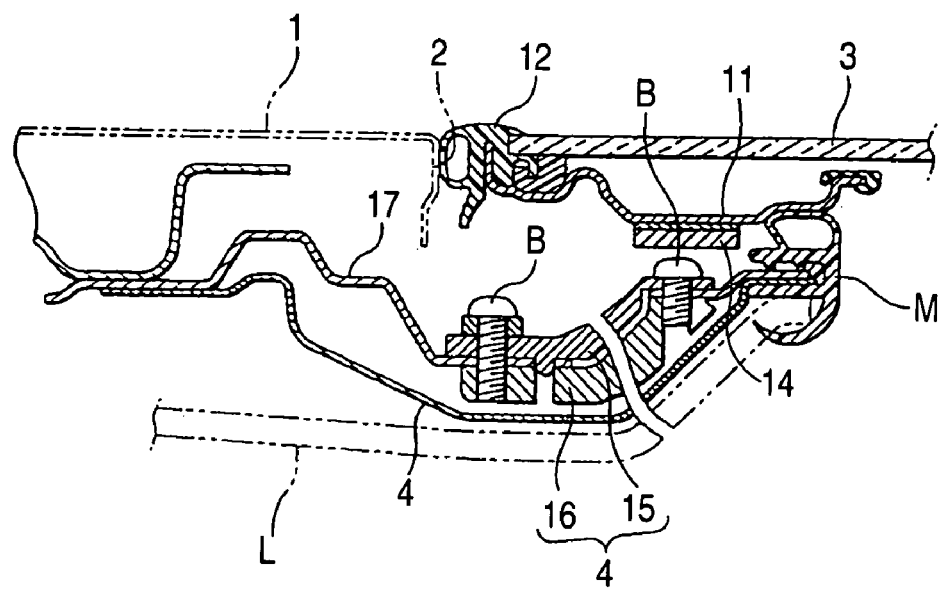
FIG. 12 is a vertical cross-sectional view, taken in the direction of arrows along line V—V in FIG. 10, of essential portions.

In the upper member 15 and the lower member 16 making up the receiver 5, dents 15a and 16a are formed on mutually opposing surfaces of longitudinally intermediate portions of these two members. The arrangement provided is such that when the left and right side end portions of the upper and lower members 15 and 16 are joined precisely, a slot 18 for insertion of the engaging piece 6 is formed between the longitudinally intermediate portions. As shown in FIG. 11, in this slot 18, an entrance is open on the diagonally rear side so as to be oriented upward, while an exit is open in the vertical plane at the front. The shape of the slot 18 as viewed from a lateral direction has a circular arc shape of a curvature similar to the curved shape of the engaging piece 6.

The opening side of the slot 18 is made slightly wider to facilitate the downward insertion of the engaging piece 6. In addition, a rearwardly extended portion 16b is formed at a rear end of the lower member 16, while upwardly oriented ribs 15b and 15c are respectively projectingly provided on an upper surface of a rear end portion and an upper surface of a front end portion of the upper member 15.

A plurality of protrusions 19 extending along the back-and-forth direction are formed on the inner surface of the lower member 16 defining the slot 18. The arrangement provided is such that these portions of the protrusions 19 are brought into sliding contact with the lower surface of the engaging piece 6. As the area of portions coming into direct contact is thus made small, compatibility is attained between the smoothness needed when the sunroof panel 3 is attached or detached and the dislocation preventing characteristic of the sunroof panel 3 when fitted in the opening 2.

A vertical pin 20 is fixed on the exit side of the slot 18 at a position corresponding to the slit 13 of the engaging piece 6. As this pin 20 enters the slit 13 of the engaging piece 6, it is possible to further reduce the rattling of the sunroof panel 3 in the left-and-right direction.

The slot 18 in the receiver 5 extends through in the back-and-forth direction unlike the fact that the conventional insertion hole described in the above-described publication is a dead-end hole. Accordingly, since the length of the portion of the engaging piece 6 for engaging with the slot 18 can be made larger than in the conventional case, it is possible to further enhance the difficulty in the removal of the sunroof panel 3 when it is tilted up, and it is possible to suppress the occurrence of free play.

On the other hand, at each of paired frame fixing portions 21 (FIG. 13) on the inner side of the upper member 15 for making up the hinge receiver 5, a bearing member 23 for rotatably supporting a deflector blade 22 is fixed to the inner frame 4 by the screws B common to the upper member 15.

Figure 14:
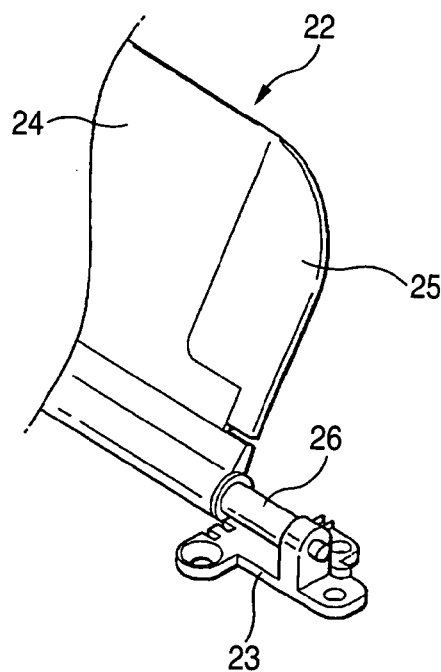
FIG. 14 is a perspective view of essential portions of a deflector blade.

As shown in FIG. 14, the deflector blade 22 consists of a main portion 24 elongated in the left-and-right direction and formed of an extrusion molding material of, for instance, an aluminum alloy, as well as a pair of end portions 25 injection molded from, for instance, a synthetic resin material. As a pair of shafts 26 screwed to left and right ends of a proximal end side of the main portion 24 are respectively supported by the bearing members 23, the deflector blade 22 is rotatable over a predetermined angular range. A torsion coil spring 27 having one end caught by the bearing member 23 and the other end caught by the end portion 25 of the deflector blade 22 is wound around the shaft 26. Consequently, resilient repulsion is constantly applied to the deflector blade 22 in a direction in which its free end is sprung up.

Figure 15:
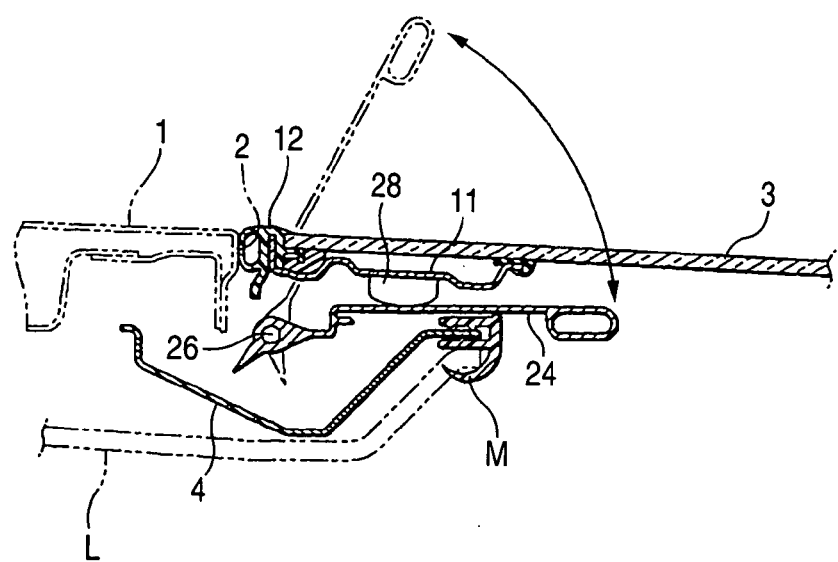
FIG. 15 is a vertical cross-sectional view, taken in the direction of arrows along line VIII—VIII in FIG. 10, of essential portions.

Thus, as shown in FIG. 15, if the sunroof panel 3 is fitted in the opening 2 of the roof 1, the deflector blade 22 is adapted to be pressed and lodged by the lower surface of the sunroof panel 3 (a pressing member 28 provided on the panel holder 11), whereas if the sunroof panel 3 is removed from the opening 2, the deflector blade 22 is adapted to rise by the resiliency of the torsion coil spring 27. Then, as the deflector blade 22 rises along the front edge of the opening 2, the air stream over the upper surface of the roof 1 is suppressed from being entrained into the vehicle compartment.

It should be noted that the inner surface of the roof is covered with a roof lining L, and the peripheral edges in the opening on the vehicle compartment side are fringed by a molding member M.

Thus, according to the present invention, since the sunroof panel is subassembled to the annular frame, these parts can be carried in the state of the subassembly. For this reason, the parts can be carried in after ensuring the quality of the sunroof in an assembled state, and the assembly to the vehicle on the line is facilitated. Further, the characteristic of tilting operation and positional accuracy can be designed and confirmed with respect to the subassemblage before its assembly to the vehicle. In contrast, in the conventional type in which a supporting frame for supporting the sunroof panel is formed in the body panel of the vehicle, the assembling operation becomes complex, involving such as the subassembling of the hinge mechanisms and the lifting mechanism with respect to the sunroof panel on the line side. Also, adjustment operation becomes troublesome due to the need to effect confirmation of the tilting operation after assembling on the line. In the structure of the present invention, however, such problems do not occur. In addition, even in cases where design changes have been made in such as the enhancement of the rigidity of the annular frame 4, it is readily possible to cope with such design changes, and the trouble involved in making design changes including those of the vehicle can be saved.

As described above in detail, according to the present invention, large advantages can be offered not only in suppressing the rattling of the sunroof panel during the traveling of the vehicle but also in reducing the occurrence of buffeting and wind noise. In addition, even in a case where it has become impossible to remove the sunroof panel due to such as the deformation of the hinge member (male member), since the hinge receiver (female member) can be split, the sunroof panel can be removed relatively easily without applying an undue force and without imparting damage to the respective parts.

As described above in detail, since the deflector blade can be installed without entailing the complication of the structure and an increase in the number of component parts and the number of manufacturing steps, a large advantage is offered in suppressing an increase in the manufacturing cost of the sunroof apparatus.

What is claimed is:

1. A tilt sunroof unit comprising:
   a sunroof panel provided tiltably with respect to a plane of an opening provided in a vehicular roof;
   an annular frame formed so as to extend continuously along an entire periphery of the opening, the annular frame being formed of a single part in which a peripheral gutter continuing along an entire periphery thereof is integrally formed, the peripheral gutter having a substantially downwardly-convex-shape is located below the periphery of the opening;
   a lifting mechanism for connecting the sunroof panel and the annular frame;
   a female member provided on the annular frame at an opening side of the roof and having an upper member and a lower member which are formed so as to be split from each other; and
   a male member provided at one edge portion of the sunroof panel to engage the female member,
   wherein a gap is formed between the upper member and the lower member and a detachable hinge mechanism is formed by the female member and the male member as the male member is inserted in the gap,
   the upper member being secured to the lower member at an upwardly accessible location within the opening periphery, and
   the tilt sunroof unit in a subassembled state with the sunroof panel assembled thereto is assembled to the roof
   wherein the female member is provided within the convex-shaped gutter of the annular frame.

2. The tilt sunroof unit according to claim 1, wherein the lifting mechanism is of a manual type.

3. The tilt sunroof unit according to claim 1, wherein the sunroof panel is detachable with respect to the plane of the opening provided in the vehicle roof.

4. The tilt sunroof unit according to claim 1, wherein a longitudinal cross-sectional shape of the male member is a circular arc shape which is downwardly convex along with the downwardly-convex-shaped gutter of the annular frame.

5. The tilt sunroof unit according to claim 1, wherein a plurality of protrusions are formed on an inner surface of the female member which comes into sliding contact with the male member.

6. The tilt sunroof unit according to claim 1, wherein a slit is formed in the male member, and a pin adapted to enter the slit is formed on the female member.

7. A tilt sunroof unit comprising:
a sunroof panel provided tiltably with respect to a plane of an opening provided in a vehicular roof;
an annular frame formed so as to extend continuously along an entire periphery of the opening, the annular frame being formed of a single part in which a peripheral gutter continuing along an entire periphery thereof is integrally formed, the peripheral gutter having a substantially downwardly-convex-shape is located below the periphery of the opening;
a lifting mechanism for connecting the sunroof panel and the annular frame;
a female member provided on the annular frame at an opening side of the roof and having an upper member and a lower member which are formed so as to be split from each other; and
a male member provided at one edge portion of the sunroof panel to engage the female member,
wherein a gap is formed between the upper member and the lower member and a detachable hinge mechanism is formed by the female member and the male member as the male member is inserted in the gap,
the detachable hinge mechanism is provided on the convex-shaped gutter of the annular frame,
the convex-shaped gutter and the detachable hinge mechanism are provided so as to stride over an edge of the periphery of the opening,
the tilt sunroof unit in a subassembled state with the sunroof panel assembled thereto is assembled to the roof, and
wherein the female member is provided within the convex-shaped gutter of the annular frame,
a deflector blade extending along a front edge of the opening,
wherein a pair of supporting portions for supporting left and right ends of the deflector blade so as to be raised and lodged are fixed to the annular frame by fixing members being common to the female member.

8. The tilt sunroof unit according to claim 7, wherein the fixing members are screws.

9. The tilt sunroof unit according to claim 1, wherein the lifting mechanism includes: a lever having one end pivotally supported by the sunroof panel and holding the sunroof panel selectively between two positions of a fully closed state and a tilt-up state; and a link rod connected between the annular frame and an intermediate portion of the lever,
wherein in the fully closed state the lever becomes a substantially lodged state with respect to the roof, and in the tilt-up state the lever becomes a substantially raised state with respect to the roof,
wherein an engaging projecting portion is provided on one of the lever and a roof-side member, while an engaging recessed portion is provided on the other thereof, the engaging projecting portion is entered the engaging recessed portion by an operation of the lever leading to the raised state, and
wherein in the substantially raised state of the lever the engaging recessed portion and the engaging projecting portion are engaged so as to prevent the displacement of the sunroof panel in a tilting direction.

10. The tilt sunroof according to claim 1, further comprising:
a mounting bracket provided on the annular frame at a position overlapping a portion of the female member.

11. The tilt sunroof according to claim 1, wherein the detachable hinge mechanism is attached to a front side of the annular frame, and
the lifting mechanism is attached to a rear side of the annular frame.

12. The tilt sunroof according to claim 1, wherein the annular frame comprises a press worked annular frame.

13. The tilt sunroof according to claim 1, wherein the annular frame includes a bracket extending outwardly,
wherein the annular frame is detachably attached to the vehicular roof in such a manner that the bracket is screwed to the roof.

14. The tilt sunroof according to claim 13, wherein the bracket is formed by press working process.

15. The tilt sunroof according to claim 13, wherein the bracket is attached to the annular frame by spot welding.

16. The tilt sunroof unit according to claim 1, wherein the split is maintained between an end of the upper member and an end of the lower member.

* * * * *